US007171067B2

(12) United States Patent
Doerr et al.

(10) Patent No.: US 7,171,067 B2
(45) Date of Patent: Jan. 30, 2007

(54) INTEGRATEABLE OPTICAL INTERLEAVER AND DE-INTERLEAVER

(75) Inventors: Christopher Richard Doerr, Middletown, NJ (US); David S. Levy, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 13 days.

(21) Appl. No.: 10/657,862

(22) Filed: Sep. 9, 2003

(65) Prior Publication Data

US 2005/0053320 A1    Mar. 10, 2005

Related U.S. Application Data

(63) Continuation-in-part of application No. 10/378,411, filed on Mar. 3, 2003, now Pat. No. 6,922,507.

(51) Int. Cl.
*G02B 6/26*    (2006.01)
*G02B 6/12*    (2006.01)

(52) U.S. Cl. .............................. 385/15; 385/14; 385/15
(58) Field of Classification Search .................. 385/15, 385/3, 8, 9, 14, 16, 17, 30, 39, 40, 129
See application file for complete search history.

(56) References Cited

U.S. PATENT DOCUMENTS 6,351,581 B1    2/2002    Doerr et al. ................... 385/24
6,519,059 B1    2/2003    Doerr et al. ................... 359/124
6,532,090 B1    3/2003    Doerr et al. ................... 359/128
6,606,433 B2*   8/2003    Oguma et al. ................. 385/37
6,724,954 B2*   4/2004    Arai et al. ..................... 385/24
6,724,957 B2*   4/2004    Saida et al. ................... 385/27
2002/0181857 A1* 12/2002  Komatsu et al. .............. 385/24
2003/0031406 A1* 2/2003   Saida et al. ................... 385/27
2004/0008944 A1* 1/2004   Johannessen et al. ......... 385/45
2004/0218259 A1* 11/2004  Hui et al. ..................... 359/344

OTHER PUBLICATIONS

Doerr et al., Optical Society of America, Mar. 23-28, 2003, p. PD33-1-3 vol. 3 of 3 vol. (v1+802+138) pp. 6 refs.*
C. R. Doerr et al., "Cross-Connect-Type Wavelength Add-Drop Node With Integrated Band Muxes, Interleavers, and Monitor", Opt. Fib. Comm. Conf., Mar. 23, 2003.
C. R. Doerr et al., "Integrated Band Demultiplexer Using Waveguide Grating Routers", IEEE Photonics Technology Letters, vol. 15, No. 8, Aug. 2003.

* cited by examiner

*Primary Examiner*—Kaveh Kianni

(57) ABSTRACT

A proposed integrateable optical interleaver includes an input Y-branch coupler and at least two multi-section optical couplers. The multi-section optical couplers of the interleaver include at least three substantially similar optical couplers, adjacent ones of the optical couplers interconnected via at least one set of waveguides. The interleaver of the present invention comprises a highly compact and fabrication-robust form that is capable of being integrated onto a single planar lightwave circuit.

7 Claims, 9 Drawing Sheets

INTEGRATEABLE OPTICAL INTERLEAVER AND DE-INTERLEAVER

CROSS-REFERENCE TO RELATED APPLICATIONS

This patent application is a continuation-in-part of and claims priority to commonly owned U.S. patent application Ser. No. 10/378,411 (now U.S. Pat. No. 6,922,507 B2) entitled "Low-Loss Integrated Optical Counler and Optical Switch", filed March 03, 2003, which is herein incomorated by reference in its entirety. This patent application is related to U.S. Pat. No. 6,532,090 entitled "Wavelength selective cross-connect with reduced complexity", issued Mar. 11, 2003, which is incorporated herein by reference in its entirety. This patent application is also related to U.S. Pat. No. 6,519,059 entitled "Wavelength division add/drop multiplexer", issued Feb. 11, 2003, which is herein incorporated by reference in its entirety.

FIELD OF THE INVENTION

This invention relates to the field of optical communication and, more specifically, to optical devices that perform interleaving and de-interleaving functions.

BACKGROUND OF THE INVENTION

The information superhighway will primarily comprise optical fibers for the foreseeable future because of the enormous bandwidth that each optical fiber provides. For example, a typical optical fiber exhibits relatively low loss over the wavelength region 820–1600 nm. This particular region provides a bandwidth of about 180,000 GHz which means that a single optical fiber can potentially carry 45 billion voice channels (4 kHz each) or 30 million television channels (6 MHz each). And while these numbers represent upper limits that are not practical to attain, they provide a compelling reason for communication carriers to use optical transmission.

In order to fully utilize this information superhighway, there is a need to filter a group of signal channels such that these channels can be further separated, redirected to a different direction, or a fraction of these channels be dropped and added. In certain applications, interleavers and de-interleavers are used to bridge technologies with different channel spacing, enabling the usage of more economical solutions associated with larger channel spacing. For example, various prior art interleavers based on a Gires-Toumois (GT) mirror and a Michelson interferometer separate a composite input optical signal into two complementary signals in which the odd data channels are branched into one output and the even channels are directed back into the input.

In other proposed prior art interleaver designs an input signal is coupled to a 50% non-polarizing cubic beam splitter through a collimating lens such as a graded index lens (GRIN) lens. A GT mirror and a regular mirror are used to form an interferometer. The odd channels return to one output fiber through another lens whereas the even channels return to the input fiber through a lens.

In yet other prior art interleaver designs based on a polarization beam splitter (PBS) and two GT mirrors an input signal is coupled to a PBS through a collimating lens. The two arms of the device are two interferometers, one for each of the polarization components. For each interferometer, a polarization and phase-modified GT mirror is used as two mirrors of the interferometer. The phases and Free Spectra Ranges (FSR) of the GT mirrors are modified/adjusted using waveplates. The relative phases of the two paths of each of the interferometers are adjusted by changing the orientations and thickness of the waveplates. Both interferometers are adjusted such that the odd channels return to one output fiber through the first lens whereas the even channels return to the other fiber through another lens.

For all of the advantages of the prior art interleaver designs, there are several areas of improvements needed. For instance, the use of a Michelson interferometer with one output returning to the same direction in requires the use of an optical circulator in the optical "circuit" in order to physically separate the output from the input. This increases the cost and form factor of such a design. Another area of improvement is in the temperature stability of the prior art devices. Device not based on a balanced design will require temperature stabilization whereas devices using thin glass plates/wave plates for fine adjustments of the interferometers introduce reliability issues such as the use of epoxy and certain temperature related drifts.

SUMMARY OF THE INVENTION

The present invention advantageously provides an integrated optical interleaver having a highly compact and fabrication-robust form.

In one embodiment of the present invention, an interleaver includes an input Y-branch coupler and at least two multi-section optical couplers. The multi-section optical couplers of the interleaver include at least three substantially similar optical couplers, adjacent ones of the optical couplers interconnected via at least one set of waveguides. The interleaver of the present invention is capable of being integrated onto a single planar lightwave circuit.

In an alternate embodiment of the present invention an interleaver in accordance with the present invention is implemented within a novel OADM node. The novel OADM node includes a de-interleaver, in accordance with the present invention, for separating an input optical signal into at least two optical signals comprising distinct sets of optical channels and for directing the at least two optical signals along separate paths, and a wavelength-cross-connect optically coupled to the de-interleaver. The wavelength-cross-connect is adapted to receive at least one of the at least two optical signals from the de-interleaver and to drop selected ones of the optical channels in the received optical signal and pass through the remainder of the received optical signal. The novel OADM node further includes a coupler optically coupled to the wavelength-cross-connect for adding optical channels to the optical signal passed through the wavelength-cross-connect, and an interleaver, in accordance with the present invention, optically coupled to the coupler and all of the separate paths for combining the separated optical signals. The novel OADM node is capable of being constructed in planar waveguide technology onto a single planar lightwave circuit.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Although the concepts of the present invention herein are being described with respect to various embodiments of interleavers comprising two multi-section optical couplers comprising three substantially similar optical couplers, it should be noted that the specific interleavers are simply provided as embodiments of the present invention and should not be treated as limiting the scope of the invention. It will be appreciated by one skilled in the art informed by the teachings of the present invention that the concepts of the present invention may be applied in interleavers comprising a single multi-section optical coupler or a plurality of multi-section optical couplers each comprising other numbers of substantially similar optical couplers.

Figure 1:
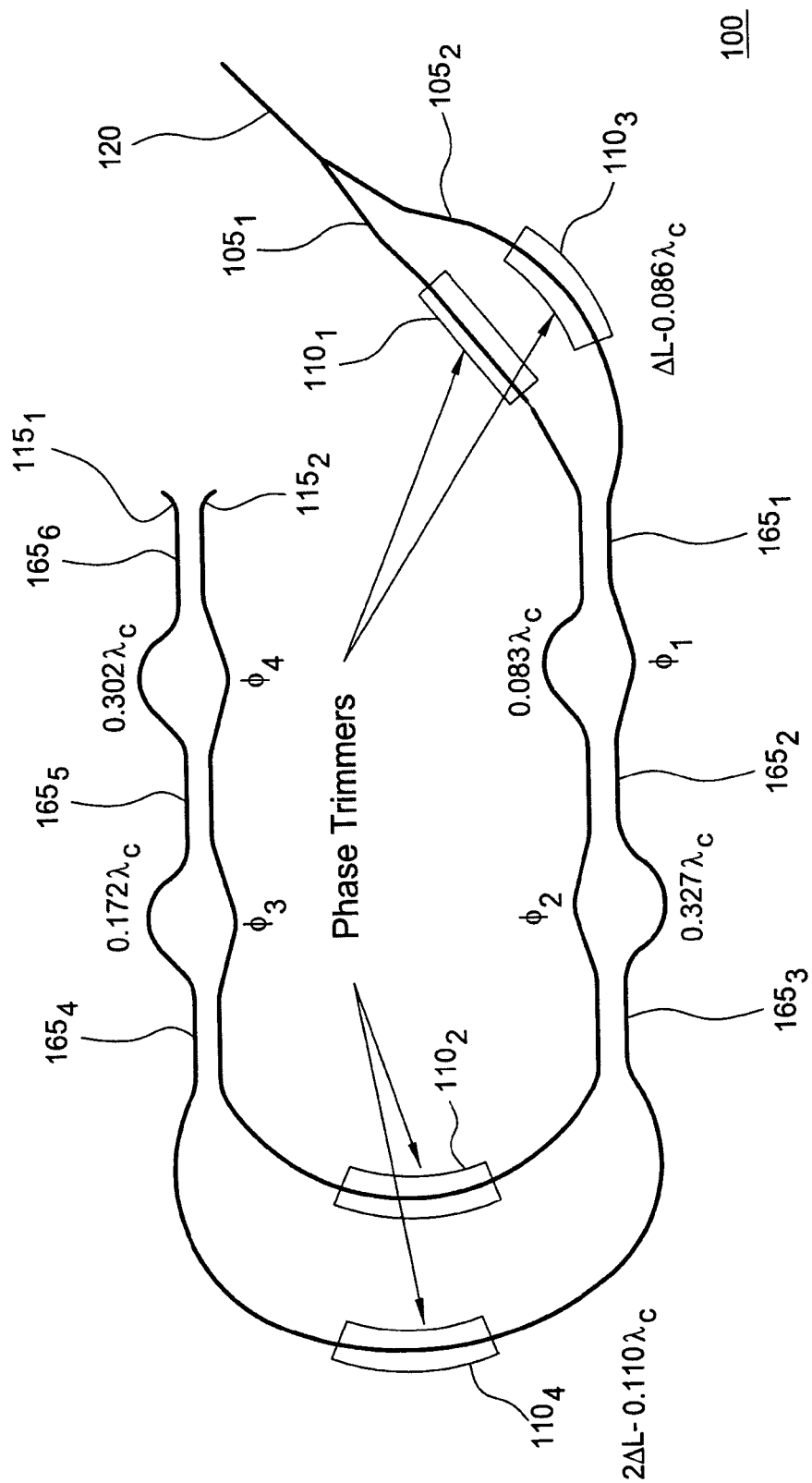
FIG. 1 depicts a high level block diagram of one embodiment of an interleaver/de-interleaver in accordance with the present invention

FIG. 1 depicts a high level block diagram of one embodiment of an interleaver/de-interleaver in accordance with the present invention. Because the function of a de-interleaver and an interleaver are substantially similar, the interleaver 100 of FIG. 1 is meant to be a representative embodiment of both a de-interleaver and an interleaver in accordance with the present invention. The interleaver 100 of FIG. 1 is illustratively a Fourier-filter type interleaver. That is, the interleaver 100 comprises a two-stage Mach-Zehnder interferometer (MZI) comprising two arms $105_1$ and $105_2$. The interleaver 100 further comprises means for causing a phase shift (illustratively two thermooptic trimmers on each arm) $110_1$, $110_2$, $110_3$ and $110_4$ on the MZI arms $105_1$, $105_2$ to adjust the phases in the arms $105_1$, $105_2$. Each of the MZI arms $105_1$, $105_2$ further comprises a respective output port $115_1$ and $115_2$. In order to configure the integrated interleavers with a high yield yet a compact form factor, a y-branch coupler 120 is implemented as a first coupler for the interleaver 100, while novel multi-section optical couplers are implemented for the following two couplers of the interleaver 100.

The multi-section optical couplers of FIG. 1 each illustratively comprise three evanescent couplers $165_1$, $165_2$, $165_3$, $165_4$, $165_5$ and $165_6$ (collectively evanescent couplers 165). The two sets of three evanescent couplers 165 each comprise relative path length differences between respective waveguides interconnecting the three evanescent couplers 165. The relative path length differences correspond to respective phase differences $\phi_1$, $\phi_2$, and $\phi_3$, $\phi_4$ at a center wavelength of interest. Illustratively in FIG. 1, $\gamma_c$ depicts a central wavelength of interest and the numbers indicate the local path-length differences. Such multi-section optical couplers are described in U.S. patent application Ser. No. 10/378,411 entitled "Low-Loss Integrated Optical Coupler and Optical Switch" filed Mar. 3, 2003, which is herein incorporated by reference in its entirety.

The respective three evanescent couplers 165 of the two multi-section optical couplers are substantially similar. The evanescent couplers 165 are all substantially equal in length and each comprises a nominal 90° phase shift between their local eigenmodes. Although in FIG. 1, the multi-section optical couplers are depicted as comprising evanescent couplers 165, other couplers having similar properties, such as adiabatic couplers, may be implemented within a multi-section optical coupler in accordance with the present invention. Furthermore, although in FIG. 1 the multi-section optical couplers are depicted as comprising three couplers, other numbers of couplers may be implemented within a multi-section optical coupler in accordance with the present invention.

Because in each of the multi-section optical couplers of FIG. 1 the three evanescent couplers 165 are substantially similar, the couplers 165 change in substantially the same manner in the presence of wavelength, polarization and fabrication (WPF) changes, thus providing the multi-section optical couplers with a high WPF tolerance. More specifically, the multi-section optical couplers of the present invention have coupling ratios that are less sensitive to WPF variations.

A desired power splitting ratio for the multi-section optical couplers of FIG. 1 is obtained by adjusting the respective, relative phases of $\phi_1$, $\phi_2$, and $\phi_3$, $\phi_4$ with, for example, the thermo-optic phase shifters $110_1$, $110_2$, $110_3$ and $110_4$ located within the MZI arms $105_1$, $105_2$. Specific respective, values for $\phi_1$, $\phi_2$, and $\phi_3$, $\phi_4$ are determined to obtain a desired power splitting ratio.

For example, if the inputs to a multi-section coupler are $u_1$ and $u_2$ (the complex amplitudes of the fields of an input signal), then the outputs $v_1$ and $v_2$ are characterized according to equation one (1), which follows:

$$\begin{bmatrix} v_1 \\ v_2 \end{bmatrix} = \frac{1}{2\sqrt{2}} \begin{bmatrix} \cos(\theta/2) & j\sin(\theta/2) \\ j\sin(\theta/2) & \cos(\theta/2) \end{bmatrix} \begin{bmatrix} e^{j\phi_2} & 0 \\ 0 & 1 \end{bmatrix} \\ \begin{bmatrix} \cos(\theta/2) & j\sin(\theta/2) \\ j\sin(\theta/2) & \cos(\theta/2) \end{bmatrix} \begin{bmatrix} e^{j\phi_1} & 0 \\ 0 & 1 \end{bmatrix} \\ \begin{bmatrix} \cos(\theta/2) & j\sin(\theta/2) \\ j\sin(\theta/2) & \cos(\theta/2) \end{bmatrix} \begin{bmatrix} u_1 \\ u_2 \end{bmatrix} \quad (1)$$

where θ is the accumulated phase difference between the eigenmodes in each of the evanescent couplers 165. Thus if θ=π/2+2Δ, where Δ<<1, then equation (1) is rewritten according to equation two (2), which follows:

$$\begin{bmatrix} v_1 \\ v_2 \end{bmatrix} = \frac{1}{2\sqrt{2}} \begin{bmatrix} 1-\Delta & j+j\Delta \\ j+j\Delta & 1-\Delta \end{bmatrix} \begin{bmatrix} e^{j\phi_2} & 0 \\ 0 & 1 \end{bmatrix}$$
$$\begin{bmatrix} 1-\Delta & j+j\Delta \\ j+j\Delta & 1-\Delta \end{bmatrix} \begin{bmatrix} e^{j\phi_1} & 0 \\ 0 & 1 \end{bmatrix}$$
$$\begin{bmatrix} 1-\Delta & j+j\Delta \\ j+j\Delta & 1-\Delta \end{bmatrix} \begin{bmatrix} u_1 \\ u_2 \end{bmatrix}.$$ (2)

The nominal coupling ratio is then characterized according to equation three (3), which follows:

$$R = \frac{1}{8}|1 + e^{j\phi_2} - e^{j\phi_1} + e^{j\phi_1 + j\phi_2}|^2.$$ (3)

The power-splitting ratio is thus R:(1−R). The WPF sensitivity (sensitivity to Δ) of the coupling ratio, R, is minimized according to equation four (4), which follows:

$$[1+\cos\phi_2-\cos\phi_1+\cos(\phi_1+\phi_2)][-1-\cos\phi_2-3\cos\phi_1-\cos(\phi_1+\phi_2)]=-[\sin\phi_2-\sin\phi_1+\sin(\phi_1+\phi_2)][-\sin\phi_2-3\sin\phi_1-\sin(\phi_1+\phi_2)]$$ (4)

There are thus two equations, (3) and (4), for two variables, for example, $\phi_1$ and $\phi_2$. The equations are transcendental and may be solved. Examples of solutions for $\phi_1$ and $\phi_2$ are listed in Table 1, which follows:

TABLE 1

| Coupling ratio | $\phi_1$ | $\phi_2$ |
|---|---|---|
| 50/50 | 0° | 120° |
| 75/25 | 116.9° | 34.2° |
| 90/10 | 110.1° | 58.4° |
| 100/0 | 90° | 90° |

The values of $\phi_1$ and $\phi_2$ can be interchanged and/or both multiplied by a negative one without affecting the coupling ratio (e.g., 117°, 33.7° and −117°, −33.7° and 33.7°, 117°, and −33.7°, −117° all give the same ratio). If one of the values of $\phi_1$ or $\phi_2$ is multiplied by a negative one however, the coupling ratio flips (e.g., 117°, 33.7° gives a 75/25 ratio, whereas 117°, −33.7° gives a 25/75 ratio). Also, the values of $\phi_1$ and $\phi_2$ may be slightly modified depending on whether the change in coupler ratio due to a WPF change, Δ, is desired to be maximally flat or have some ripple. Substantially the same procedures and calculations described above with respect to the determination of $\phi_1$ and $\phi_2$ may be followed with respect to determining values for $\phi_3$ and $\phi_4$.

An interleaver or de-interleaver in accordance with the present invention is capable of being constructed from planar waveguides according to well-known fabrication techniques. For example, according to one well-known fabrication technique, the waveguides are formed from glass layers deposited on the surface of a silicon substrate. A fabrication sequence includes the steps of oxidizing the silicon surface to provide a lower cladding layer, depositing a core layer of phosphosilicate glass, lithographically patterning the core layer to define the waveguide configuration, and depositing an upper core layer of phosphosilicate glass. Such a technique is discussed generally in U.S. Pat. No. 4,902,086, issued to C. H. Henry et al. on Feb. 20, 1990, which is herein incorporated by reference in its entirety. As such, an interleaver or de-interleaver in accordance with the present invention is capable of being integrated onto a planar lightwave circuit (PLC).

Figure 2:
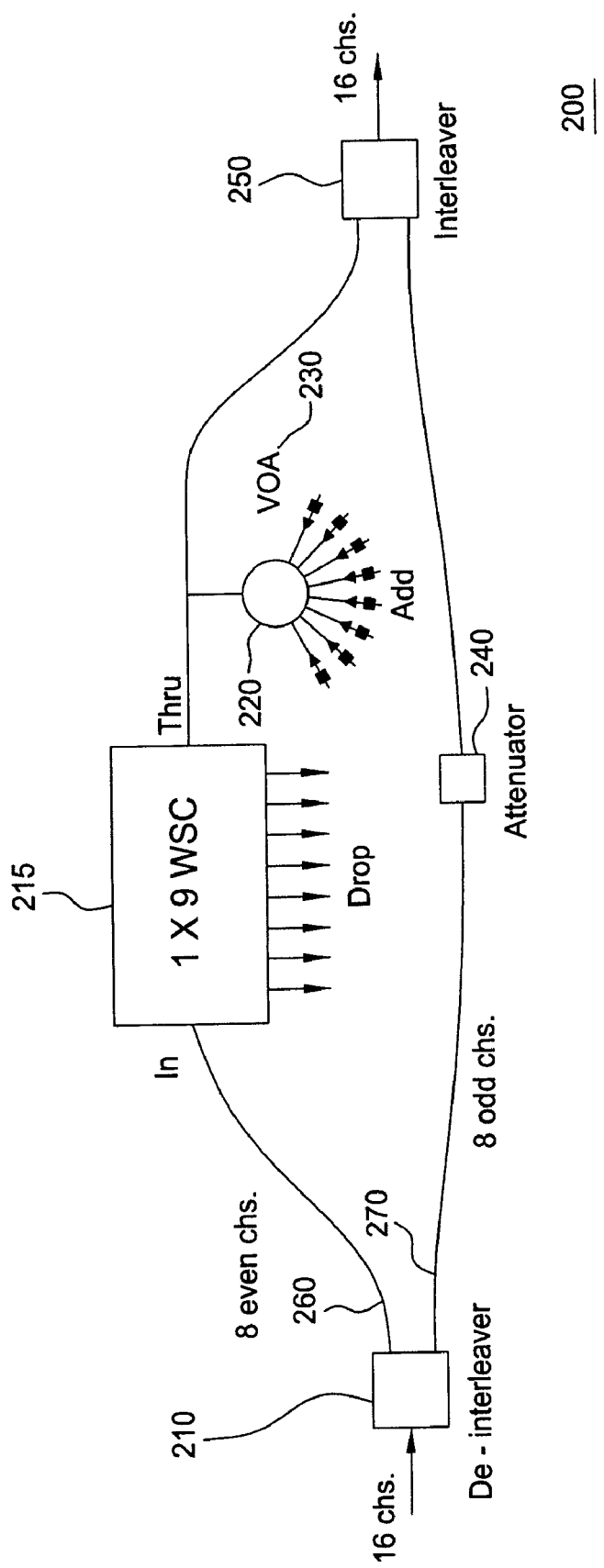
FIG. 2 depicts a high level block diagram of one embodiment of an optical add/drop multiplexer (OADM) start-up node in accordance with the present invention.

An interleaver/de-interleaver in accordance with the present invention, such as the interleaver 100 of FIG. 1, may be used in an inventive optical add/drop multiplexer (OADM) start-up node. For example, FIG. 2 depicts a high level block diagram of one embodiment of an optical add/drop multiplexer (OADM) start-up node in accordance with the present invention. The OADM start-up node 200 of FIG. 2 is illustratively designed to accommodate a 16 channel, 100 GHz spacing WDM system. The OADM start-up node 200 of FIG. 2 comprises a de-interleaver 210, such as the de-interleaver 100 of FIG. 1, a wavelength selective cross-connect (WSC) 215, a coupler (illustratively, a star coupler) 220 having a plurality of variable optical attenuators (VOAs) 230, an attenuator 240, and an interleaver 250, such as the interleaver 100 of FIG. 1. The OADM start-up node 200 of FIG. 2 further comprises, illustratively, two optical paths 260 and 270. Although in the OADM start-up node 200 of FIG. 2 various components are depicted as specific devices, other devices performing substantially similar functions may replace the depicted devices in accordance with the present invention. For example, the coupler 220 of FIG. 2 may comprise a multimode interference coupler, an evanescent coupler and the like, and the VOAs 230 may comprise micro-electromechanical system (MEMS) optical shutters. Furthermore, the attenuator 240 may also comprise an optical shutter.

In the OADM start-up node 200 of FIG. 2, a 16 channel optical signal is optically communicated to the de-interleaver 210. The de-interleaver separates the 16 channel input optical signal into two, 8-channel 200 GHz spaced signals. In the OADM start-up node 200 of FIG. 2, the de-interleaver 210 illustratively separates the 16 channel input optical signal into a first 8-channel optical signal comprising 8 even-numbered optical channels and 8 odd-numbered optical channels. Although in FIG. 2 the 16 input optical channels are separated by the de-interleaver 210 into 8 even-numbered optical channels and 8 odd-numbered optical channels, a de-interleaver in accordance with the present invention may be configured to separate input optical channels into other combinations of optical channels, such as the first eight optical channels and the last eight optical channels.

In FIG. 2, the 8 even-numbered optical channels illustratively propagate through the first optical path 260 and the 8 odd-numbered optical channels illustratively propagate through the second optical path 270. In the first optical path 260 the 8 even-numbered optical channels are optically communicated to the WSC 215. In the OADM start-up node 200 of FIG. 2, the dropping of even channels is performed by the WSC 215. The WSC 215 is illustratively a 1×9 WSC and is capable of allowing each dropped channel to appear at any of its output ports. Such a WSC is described in U.S. Pat. No. 6,532,090 entitled "Wavelength selective cross-connect with reduced complexity", issued Mar. 11, 2003 to Christopher Doerr, which is herein incorporated by reference in its entirety. The optical channels not dropped by the WSC 215 propagate through the WSC 215 in the first optical path 260.

In the first optical path 260, optical channels are added by the coupler 220 to the optical signal passed through by the WSC 215. The coupler 220 is illustratively a 1×8 star coupler and is capable of allowing each added channel to be of any wavelength, assuming tunable transmitters. Such a coupler is described in U.S. Pat. No. 6,519,059 entitled "Wavelength division add/drop multiplexer", issued Feb. 11, 2003 to Christopher Doerr, which is herein incorporated by reference in its entirety.

The optical signals in the second optical path 270, illustratively the 8 odd-numbered optical channels, are optically communicated to the attenuator 240. When open, the attenuator 240 permits any optical signal communicated from the de-interleaver 210 to pass through to the interleaver 250. When closed, the attenuator 240 absorbs or reflects, desirably with high efficiency, an incident optical channel or channels preventing the channel(s) from reaching the interleaver 250. An attenuator in accordance with the present invention may be configured to absorb or reflect one or more of the optical channels in the path wherein it resides.

The optical signals in the first optical path 260 and the second optical path 270 are then communicated to the interleaver 250 wherein the optical signals are combined, for example, to resemble the input optical signal (e.g., a 16 channel optical signal with 100 GHz channel spacing). In alternate embodiments of the present invention, to increase the add/drop capacity of the OADM start-up node 200 of FIG. 2, the attenuator 240 in the second optical path 270 may be replaced with a second WSC and a second coupler. As evident from FIG. 2, the OADM start-up node 200 is expandable without the disruption of the 8 even-numbered channels in the first optical path 260.

Figure 3:
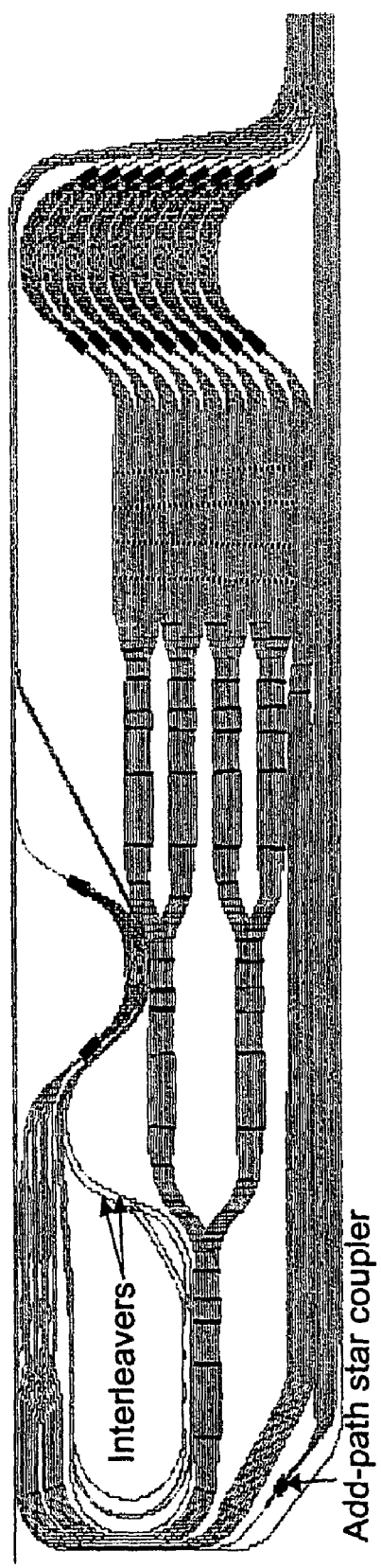
FIG. 3 depicts a more detailed diagram of the OADM start-up node of FIG. 1 in PLC technology.

In alternate embodiments of the present invention, to make the OADM start-up node 200 low cost, the inventors integrated the de-interleaver 210, the WSC 215, the coupler 220 having the VOAs 230 and the interleaver 250 onto one silica waveguide planar lightwave circuit (PLC). FIG. 3 depicts a more detailed diagram of the OADM start-up node 200 of FIG. 2 as a PLC. The inventive PLC OADM start-up node 200 proposed by the inventors comprises a small form factor such that at least three PLC OADMs are capable of being constructed out of a 5 inch silica wafer.

In addition, the interleavers of the present invention are configured to cancel non-zero chromatic dispersion by cascading two stages of the inventive OADM start-up node in accordance with the present invention. For example, in one embodiment of the present invention, the MZI arm lengths of one of the interleavers (e.g., the de-interleaver 210 of FIG. 2 or the interleaver 250 of FIG. 2) is adjusted to shift the wavelength response by substantially half of the interleaver free-spectral range. As such, the net chromatic dispersion in an OADM start-up node in accordance with the present invention for the channels that are not dropped by the WSC is substantially zero.

In an experiment, the inventors constructed a PLC of an embodiment of an inventive OADM start-up node in accordance with the present invention using 0.80% index-step silica waveguides on a silicon substrate. The PLC was fully packaged with its own drivers on a circuit board. One phase shifter on one MZI arm of each of the stages of each interleaver were accessed via probe needles connected to voltage sources. These two voltages were adjusted so as to wavelength-align the interleaver to the WSC passbands and to optimize the crosstalk. For approximately 5 seconds, each voltage was increased to an extremely high value and then decreased, so as to trim via hyperheating. This process was repeated until both applied voltages became zero, leaving the interleaver permanently adjusted and passive.

Figure 4:
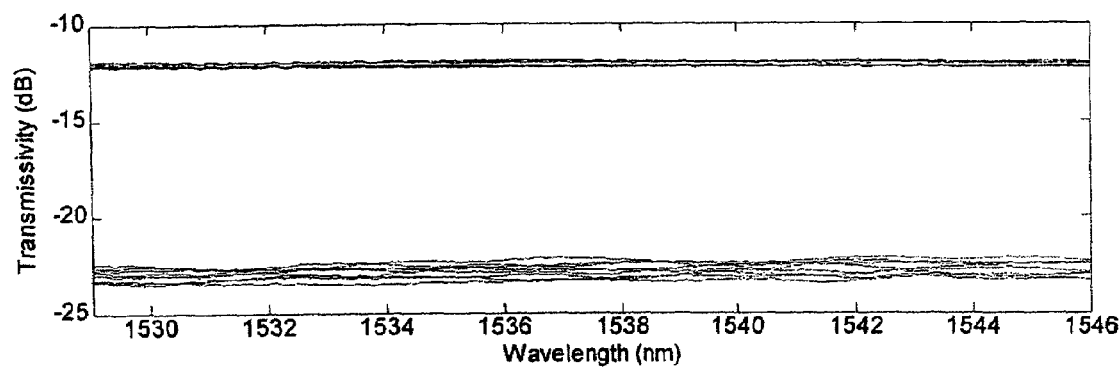
FIG. 4 graphically depicts the measured spectra of eight add paths for eight inputs to an embodiment of a OADM start-up node in accordance with the present invention with variable optical attenuators of an add-star coupler of the OADM start-up node set at 0-dB and 10-dB attenuation.

The add-star coupler path transmissivities for 8 inputs to the OADM start-up node (i.e., 8 even-numbered channels of 16 input channels to the OADM start-up node) are depicted in FIG. 4 with the VOAs set at 0- and 10-dB attenuation. FIG. 4 graphically depicts the measured spectra of the eight add paths for the 8 inputs to the OADM start-up node with the VOAs of the add-star coupler of the OADM start-up node set at 0-dB and 10-dB attenuation. In FIG. 4, the transmissivity of the eight add-star coupler paths is plotted against the wavelength range of the input channels. As evident from FIG. 4, the add-star coupler achieves a uniform and relatively low-loss performance across the wavelength range of the input channels. The VOAs are operated in a push-pull fashion and the polarization-dependent loss (PDL) of the entire add path over the 10-dB range is <1.0 dB. To achieve such uniform, relatively low-loss performance, a symmetric star coupler was used (except for a port shift) with strong mutual coupling and focusing on the phase centers in the arrays, along with segmentation and parallel inlet horn walls. The technique of achieving low insertion loss using parallel inlet horn walls is generally discussed in C. R. Doerr, R. Pafchek, and L. W. Stulz, "16-band integrated dynamic gain equalization filter with less than 2.8-db insertion loss," IEEE Photon. Technol. Lett., vol. 14, pp.334–336, 2002, which is herein incorporated by reference in its entirety.

Figure 5:
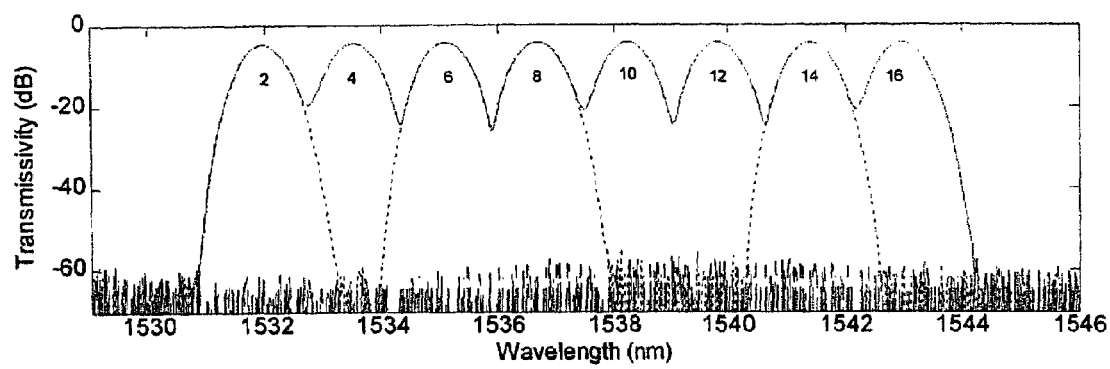
FIG. 5 graphically depicts the measured in-to-thru spectra of a wavelength selective cross-connect of the OADM start-up node of FIG. 4 for three different combinations of eight input channels.

The in-to-thru spectra of the WSC of the OADM start-up node are depicted in FIG. 5 for three different combinations of the 8 input channels described above. FIG. 5 graphically depicts the measured in-to-thru spectra of the WSC for three cases, overlaid: 1) no channels dropped, 2) all channels dropped and, 3) only channels 4, 10 and 12 dropped. In FIG. 5, the transmissivity of the WSC is plotted against the wavelength range of the input channels. As evident in FIG. 5, the worst-case loss is less than 4.75 dB and the worst-case extinction ratio is greater than 55 dB. Thru shutters in the WSC also act as VOAs, and the in-to-thru worst-case PDL at 0-dB and 12-dB attenuation are 0.1 and 0.6 dB, respectively.

Figure 6:
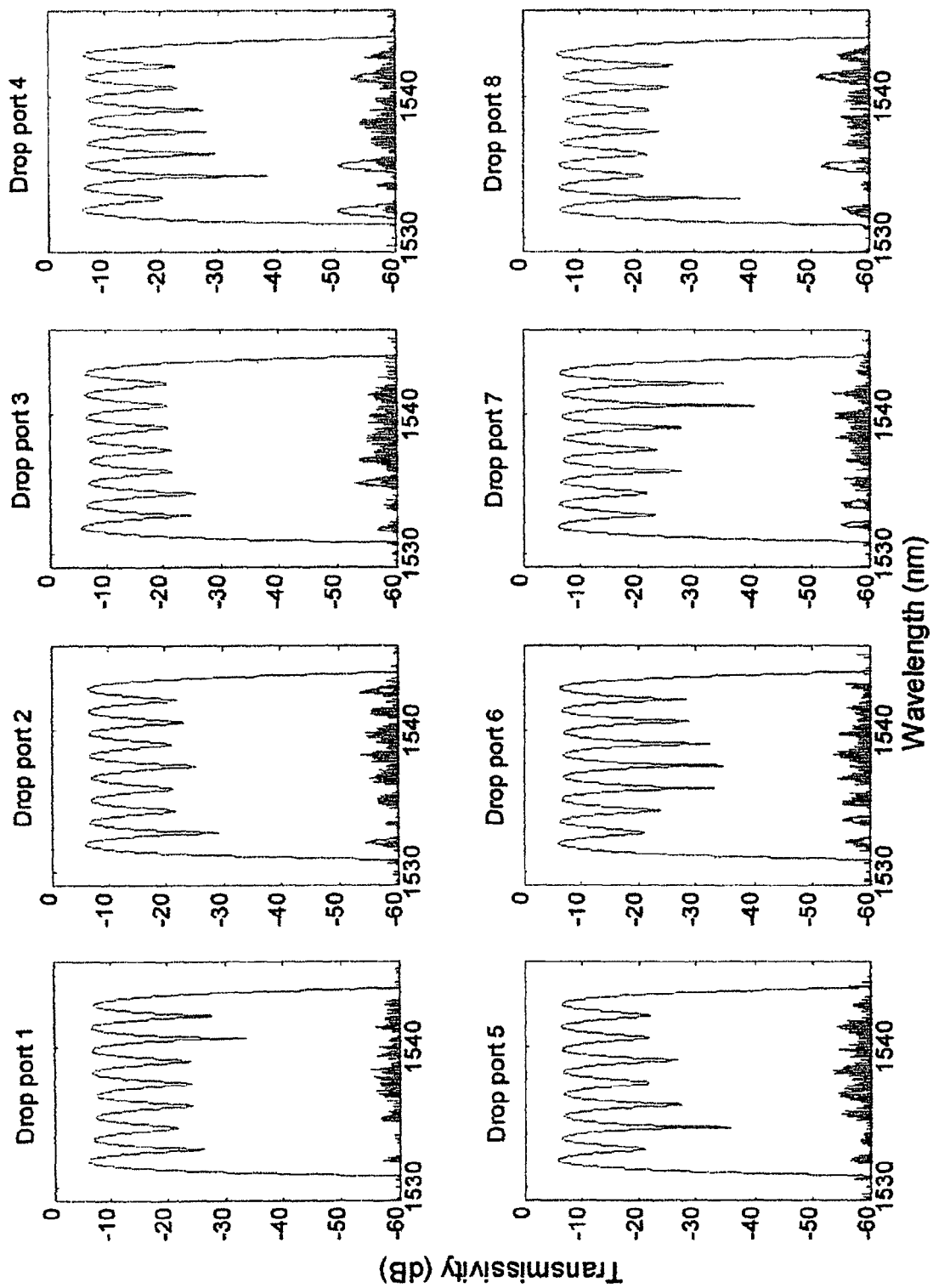
FIG. 6 graphically depicts the measured in-to-drop spectra of the WSC of the OADM start-up node of FIG. 4 for sending all of the eight input channels to each of the eight drop ports of the WSC.

The in-to-drop spectra of the WSC for sending all 8 input channels to each of the 8 drop ports in succession are depicted in FIG. 6. FIG. 6 graphically depicts the measured in-to-drop spectra of the WSC for sending all of the 8 input channels to each of the 8 drop ports of the WSC. In FIG. 6, the transmissivity of the drop ports of the WSC is plotted against the wavelength range of the input channels for each plot. As evident in FIG. 6, the worst-case loss is less than 7.5 dB, and the worst-case extinction ratio is greater than 43 dB. To ensure that the extinction ratio is adequate for all 98 possible states of the WSC without measuring them all, each of the switches/shutters was toggled individually, with and without its neighbors activated (to account for thermal crosstalk) and the worst-case extinction ratio of each switch/shutter was measured over all polarizations. The worst-case extinction ratios for all 72 shutters were determined to be between 22.6 and 39.2 dB and for all 64 1×2 switches, for both up and down states, were determined to be between 20.0 and 36.6 dB. Thus the worst possible crosstalk is approximately 42.6 dB.

Figure 7A:
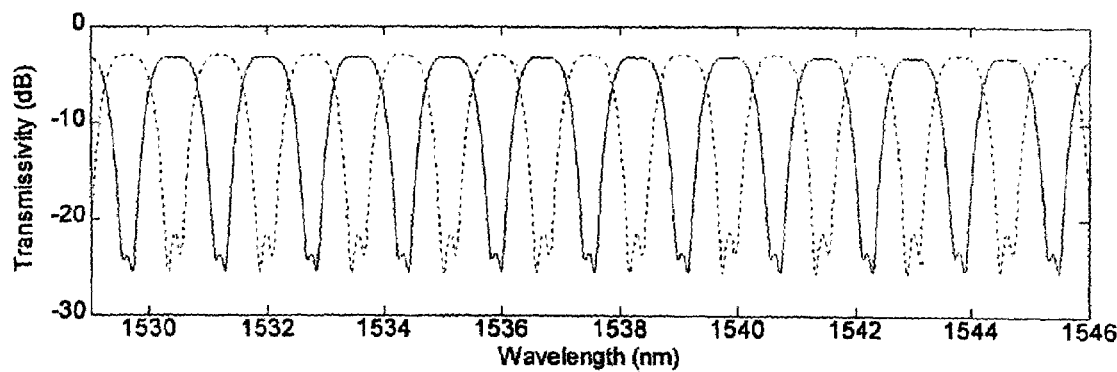
FIGS. 7a and 7b graphically depict the measured spectra of the interleavers of the OADM start-up node of FIG. 4.
Figure 7B:
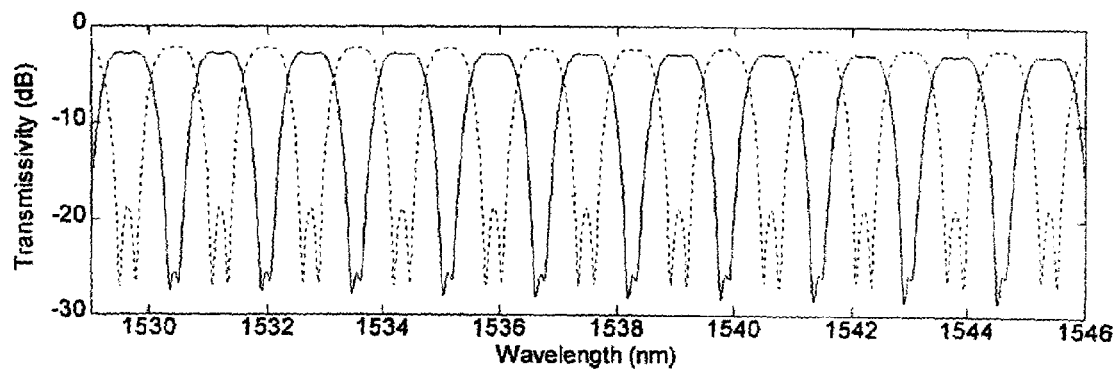

FIGS. 7a and 7b graphically depict the measured spectra of the interleavers of the OADM start-up node. In FIGS. 7a and 7b, the transmissivity of an outer interleaver and an inner interleaver, respectively, are plotted against the wavelength range of the input channels for each plot. As evident from FIGS. 7a and 7b, the loss of the interleavers ranges from 2.25 dB to 3.25 dB. The PDL is in the range of 0.1 dB.

Figure 8:
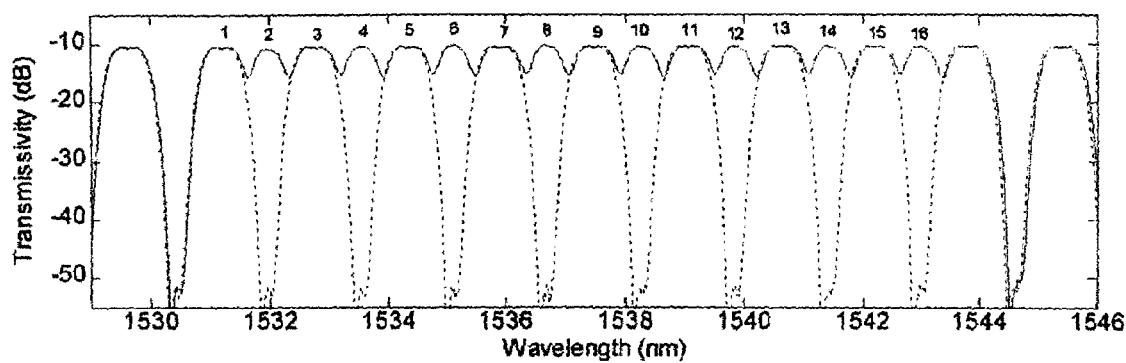
FIG. 8 graphically depicts the through-path spectra of the OADM start-up node of FIG. 4 for the cases of no channels dropped and all input channels dropped.

FIG. 8 graphically depicts the through-path spectra of the OADM start-up node for the cases of no channels dropped and all input channels dropped. In FIG. 8, the measured spectra of the OADM start-up node is measured at the output of the interleaver of the OADM start-up node and overlaid for the cases of no channels dropped and all of the 8 even-numbered input channels dropped. In FIG. 8, the transmissivity of the OADM start-up node is plotted against the wavelength range of the input channels. As evident from FIG. 8, the worst-case through loss is less than 14 dB.

Figure 9:
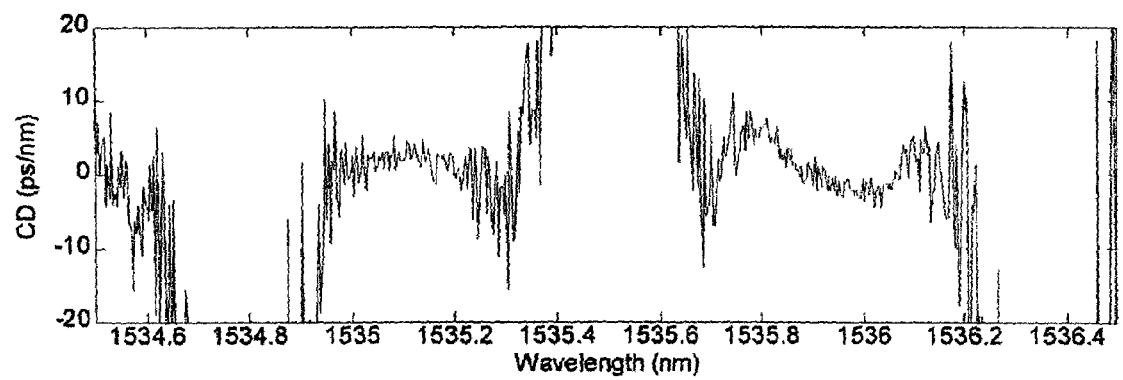
FIG. 9 graphically depicts the measured chromatic dispersion for the through-path of the OADM start-up node of FIG. 4.

FIG. 9 graphically depicts the measured chromatic dispersion for the through path of the OADM start-up node. In FIG. 9, the chromatic dispersion of the OADM start-up node is plotted against the wavelength range of the input channels. As evident from FIG. 9, the magnitude of the chromatic dispersion of this embodiment of a OADM start-up node of the present invention is less than 8 ps/nm over the entire passband.

Figure 10:
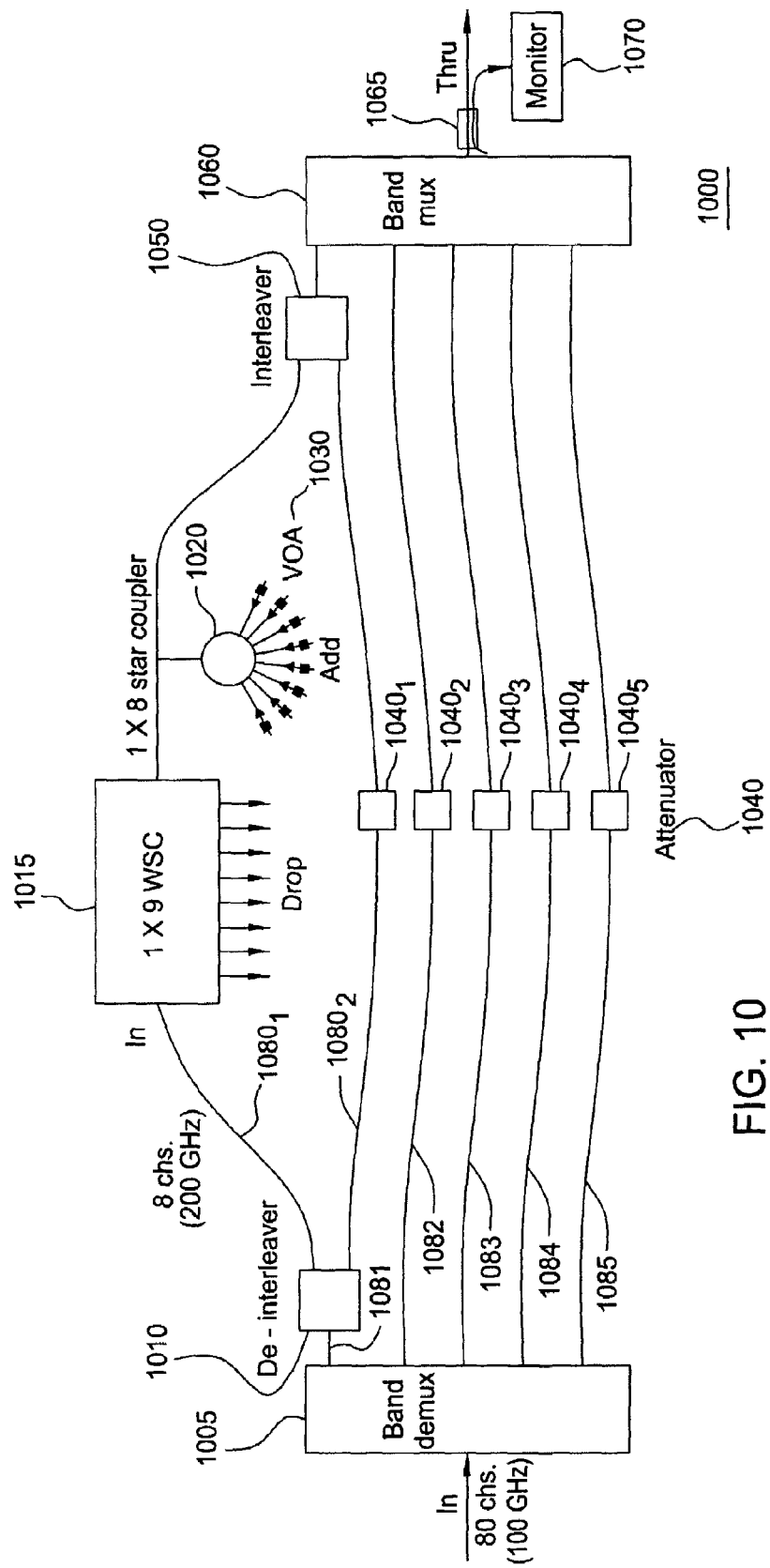
FIG. 10 depicts a high level block diagram of an alternate embodiment of an OADM start-up node in accordance with the present invention.

FIG. 10 depicts a high level block diagram of an alternate embodiment of an OADM start-up node in accordance with the present invention. The OADM start-up node 1000 of FIG. 10 is illustratively designed to accommodate an 80 channel, 100 GHz spacing WDM system. The OADM start-up node 1000 of FIG. 10 comprises substantially similar components as the OADM start-up node 100 of FIG. 1 with the addition of two band filters, an optional output coupler and an optional optical monitor. More specifically, the OADM start-up node 1000 of FIG. 10 comprises an input band filter (illustratively, a band demultiplexer) 1005, a de-interleaver 1010, a wavelength selective cross-connect (WSC) 1015, a coupler (illustratively, a star coupler) 1020 having a plurality of variable optical attenuators (VOAs) 1030, a plurality of attenuators (illustratively, five attenuators) $1040_1$–$1040_5$ (collectively attenuators 1040), an interleaver 1050, an output band filter (illustratively a band multiplexer) 1060, an output coupler 1065 and a monitor 1070. The OADM start-up node 1000 of FIG. 10 further comprises a plurality of optical paths (illustratively, five optical paths) 1081, 1082, 1083, 1084 and 1085 (collectively optical paths 1080). In addition, the first optical path 1081 is further divided into two separate optical paths $1081_1$ and $1081_2$. Although in the OADM start-up node 1000 of FIG. 10 various components are depicted as specific devices, other devices performing substantially similar functions may replace the depicted devices in accordance with the present invention. For example, the coupler 1020 of FIG. 10 may comprise a multimode interference coupler, an evanescent coupler and the like, the monitor 1070 may comprise a photodetector, and the VOAs 1030 may comprise microelectromechanical system (MEMS) optical shutters. Furthermore, the attenuators 1040 may also comprise optical shutters.

In the OADM start-up node 1000 of FIG. 10, an 80 channel optical signal is optically coupled to the band demultiplexer 1005. The band demulitplexer 1005 separates the incoming optical spectrum into bands. In the OADM start-up node 1000 of FIG. 10, the band demulitplexer 1005 illustratively separates the 80 channel input optical signal into ten, 8-channel 200 GHz spaced optical bands. Two distinct bands of the ten, 8-channel 200 GHz spaced optical bands propagate through each of the five optical channels 1080 in the OADM start-up node 1000 of FIG. 10. As depicted in FIG. 10, the two optical bands received by the first optical path 1081 are optically coupled to the de-interleaver 1010. In the OADM start-up node 1000 of FIG. 10, the de-interleaver 1010 illustratively separates the received two, 8-channel 200 GHz spaced optical bands and directs each of the bands into a separate path. Illustratively, a first band of the 8-channel 200 GHz spaced optical bands is directed through the first separated optical path $1081_1$ of the first optical path 1081 and a second of the 8-channel 200 GHz spaced optical bands is directed through the second separated optical path $1081_2$. Although in FIG. 10 the two, 8-channel 200 GHz spaced optical bands are separated by the de-interleaver 1010 and directed into separate optical paths by band, a de-interleaver in accordance with the present invention may be configured to separate input optical channels into other combinations of optical channels, such as the first eight optical channels and the last eight optical channels or the optical channels may be separated into even-numbered optical channels and odd-numbered optical channels.

In the first separated optical path $1081_1$, the first 8-channel 200 GHz spaced optical band propagates to the WSC 1015. In the OADM start-up node 1000 of FIG. 10, the dropping of the channels is performed by the WSC 1015. The WSC 1015 is illustratively a 1×9 WSC and is capable of allowing each dropped channel to appear at any of its output ports. As described above for the OADM start-up node 100 of FIG. 1, such a WSC is described in U.S. Pat. No. 6,532,090 entitled "Wavelength selective cross-connect with reduced complexity", issued Mar. 11, 2003 to Christopher Doerr, which is herein incorporated by reference in its entirety. The optical channels not dropped by the WSC 1015 pass through the WSC 1015 in the first separated optical path $1081_1$.

In the first separated optical path $1081_1$, optical channels are added by the coupler 1020 to the optical signal passed through by the WSC 1015. The coupler 1020 is illustratively a 1×8 star coupler and is capable of allowing each added channel to be of any wavelength, assuming tunable transmitters. As described above for the OADM start-up node 100 of FIG. 1, such a coupler is described in U.S. Pat. No. 6,519,059 entitled "Wavelength division add/drop multiplexer", issued Feb. 11, 2003 to Christopher Doerr, which is herein incorporated by reference in its entirety.

In the second separated optical path $1081_2$, the second 8-channel 200 GHz spaced optical band propagates to attenuator $1040_1$. When open, the attenuator $1040_1$ permits any optical signal communicated from the de-interleaver 1010 to pass through to the interleaver 1050. When closed, the attenuator $1040_1$ absorbs or reflects, desirably with high efficiency, an incident optical channel or channels preventing the channel(s) from reaching the interleaver 1050. An attenuator in accordance with the present invention may be configured to absorb or reflect one or more of the optical channels in the path wherein it resides.

The optical signals in the first separated optical path $1080_1$ and the second separated optical path $1080_2$ then propagate to the interleaver 1050 wherein the optical signals are combined, for example, to resemble the input optical signal (e.g., two, 8-channel 200 GHz spaced optical bands).

The optical signals from the interleaver 1050 then propagate to the band multiplexer 1060 wherein the two, 8-channel 200 GHz spaced optical bands are recombined. A portion of the recombined signal exiting from the band multiplexer 1060 (typically approximately 5%) is tapped by the output coupler 1065 and coupled to the optional monitor 1070. The monitor 1070 measures the intensity of the tapped optical signal, which may be used to determine a control signal that may be communicated to the attenuators 1040 and/or the VOAs 1030 to adjust channel power levels. The output coupler 1065 of the OADM start-up node 1000 of FIG. 10 may comprise any well known optical couplers, such as a beam splitter, a tap and the like, or in alternate embodiments of the present invention, the output coupler 1065 may comprise a novel multi-section optical coupler as described above and in U.S. patent application Ser. No. 10/378,411 entitled "Low-Loss Integrated Optical Coupler and Optical Switch" filed Mar. 3, 2003, which is herein incorporated by reference in its entirety. Although the OADM start-up node 1000 of FIG. 10 is depicted as comprising an optional output coupler 1065 and an optional optical monitor 1070, alternate embodiments of the present invention do not comprise the output coupler 1065 and the optical monitor 1070. The added feature of measuring the intensity of the filtered tapped optical signal and using the measured intensity to determine a control signal that may be communicated to the attenuators 1040 and/or the VOAs 1030 to adjust channel power levels is not considered by the inventors as an essential feature of the present invention.

In alternate embodiments of the present invention, to increase the add/drop capacity of the OADM start-up node 1000 of FIG. 10, the attenuator $1040_1$ in the second separated optical path $1080_2$ may be replaced with a second WSC and a second star coupler. As evident from FIG. 10, the OADM start-up node 1000 is expandable without the disruption of the first 8-channel 200 GHz spaced optical band in the first separated optical path $1080_1$. The capacity of the OADM start-up node 1000 of FIG. 10 may be further increased by replacing the second optical path 1082 with an optical path similar to the first optical path 1081, including the two separated optical paths $1081_1$, $1081_2$ and the components located in those paths $1081_1$, $1081_2$. Similarly, the capacity of the OADM start-up node 1000 of FIG. 10 may be further increased by expanding any or all of the optical paths 1080 to include optical components as described above in the first and second optical paths 1081, 1082.

Figure 11:
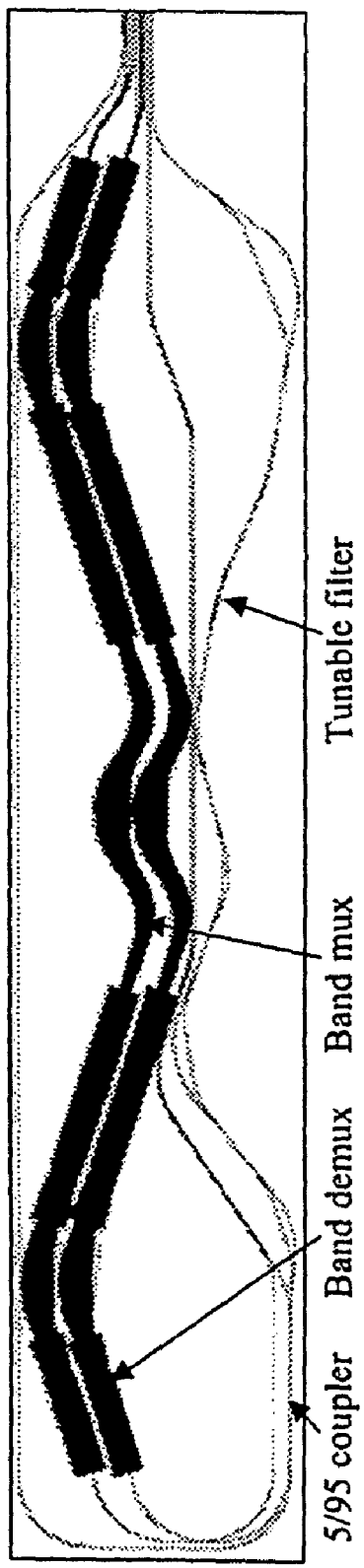
FIG. 11 depicts a more detailed diagram of the OADM start-up node of FIG. 10 in PLC technology.

In various embodiments of the present invention, to make the OADM start-up node 1000 low cost, the inventors integrate the de-interleaver 1010, the WSC 1015, the coupler 1020 having the VOAs 1030 and the interleaver 1050 onto one silica waveguide planar lightwave circuit (PLC) and the band demultiplexer 1005, band multiplexer 1060 and monitor 1070 onto a second PLC circuit. FIG. 11 depicts a more detailed diagram of the OADM start-up node 1000 of FIG. 10 in PLC technology. The inventive PLC OADM start-up node 1000 proposed by the inventors comprises a small form factor such that at least three PLC OADMs are capable of being constructed out of a 5-inch silica wafer.

In alternate embodiments of the present invention, the band filters of the present invention (e.g., the band demultiplexer and the band multiplexer) are a novel arrangement of two substantially perfectly sampled waveguide grating routers (WGRs). Such band filters are described in a commonly assigned patent application, entitled "INTEGRATED BAND FILTER USING WAVEGUIDE GRATING ROUTERS" submitted by Christopher Doerr and assigned to Lucent Technologies, which is herein incorporated by reference in its entirety.

In alternate embodiments of the present invention, the optional optical monitor of the present invention is a novel arrangement requiring only a single fiber-coupled photodetector. Such an optical monitor is described in a commonly assigned patent application, entitled "Integrateable Optical Monitor" submitted by Christopher Doerr and assigned to Lucent Technologies, which is herein incorporated by reference in its entirety.

Briefly stated, in this embodiment of the present invention, after exiting the band multiplexer, a portion of the spectrum is tapped by a coupler of the present invention and optically coupled to the monitor of the present invention. In the monitor, the portion of the spectrum tapped by the coupler propagates through a scanning tunable filter consisting of a plurality of incoherently coupled thermooptically-tuned MZI filters with an exponential distribution of free-spectral range from at least 200 to 12800 GHz. The optical signal reflects off a fiber-coupled Faraday rotator mirror, passes again through the tunable filter (significantly improving resolution, extinction ratio, and polarization dependence), passes through the coupler again, and subsequently, the filtered spectrum is measured by a photodetector.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. An interleaver of optical channels, comprising:
   an input Y-branch waveguide having a first output and a second output;
   a first phase shifter, disposed between the first Y-branch waveguide output and a first input of a first multi-sectional coupler, the first multi-sectional coupler comprising at least two couplers connected in series;
   a second phase shifter, disposed between the second Y-branch waveguide output and a second input of the first multi-sectional coupler;
   a third phase shifter, disposed between a first output of the first multi-sectional coupler a first input of a second multi-sectional coupler, the second multi-sectional coupler comprising at least two couplers connected in series; and
   a fourth phase shifter, disposed between a second output of the first multi-sectional coupler a second input of the second multi-sectional coupler; wherein
   a first output of the second multi-sectional coupler is associated with a first group of optical channels; and
   a second output of the second multi-sectional coupler is associated with a second group of optical channels.

2. The interleaver of claim 1, wherein each of said multi-section optical couplers comprises a chain including three optical couplers where adjacent couplers are coupled using waveguides each selectively providing a pre-determined phase shift.

3. The interleaver of claim 2, wherein in the multi-sectional coupler;
   one optical waveguide couples a first output of a first optical coupler to a first input of a second optical coupler;
   another optical waveguide couples a second output of a first optical coupler to a second input of a second optical coupler;
   yet another optical waveguide couples a first output of a second optical coupler to a first input of a third optical coupler; and
   still another optical waveguide couples a second output of a second optical coupler to a second input of a third optical coupler.

4. The interleaver of claim 2, wherein each of said optical couplers is selected from the group consisting of an evanescent coupler and an adiabatic coupler.

5. The interleaver of claim 1, wherein the input Y-branch waveguide splits power of an input optical signal between a first output and a second output in a pre-determined ratio.

6. The interleaver of claim 1, wherein said interleaver is an integrated planar lightwave circuit.

7. The interleaver of claim 1, wherein each of said phase shifters is a controlled thermooptic heater.

* * * * *